Aug. 15, 1939.   R. S. DRUMMOND   2,169,632
METHOD OF MAKING ROTARY GEAR CUTTERS
Filed Feb. 8, 1937   2 Sheets-Sheet 1

*INVENTOR*
ROBERT. S. DRUMMOND
BY Whittemore Hulbert & Belknap
*ATTORNEYS*

Aug. 15, 1939.   R. S. DRUMMOND   2,169,632
METHOD OF MAKING ROTARY GEAR CUTTERS
Filed Feb. 8, 1937    2 Sheets-Sheet 2
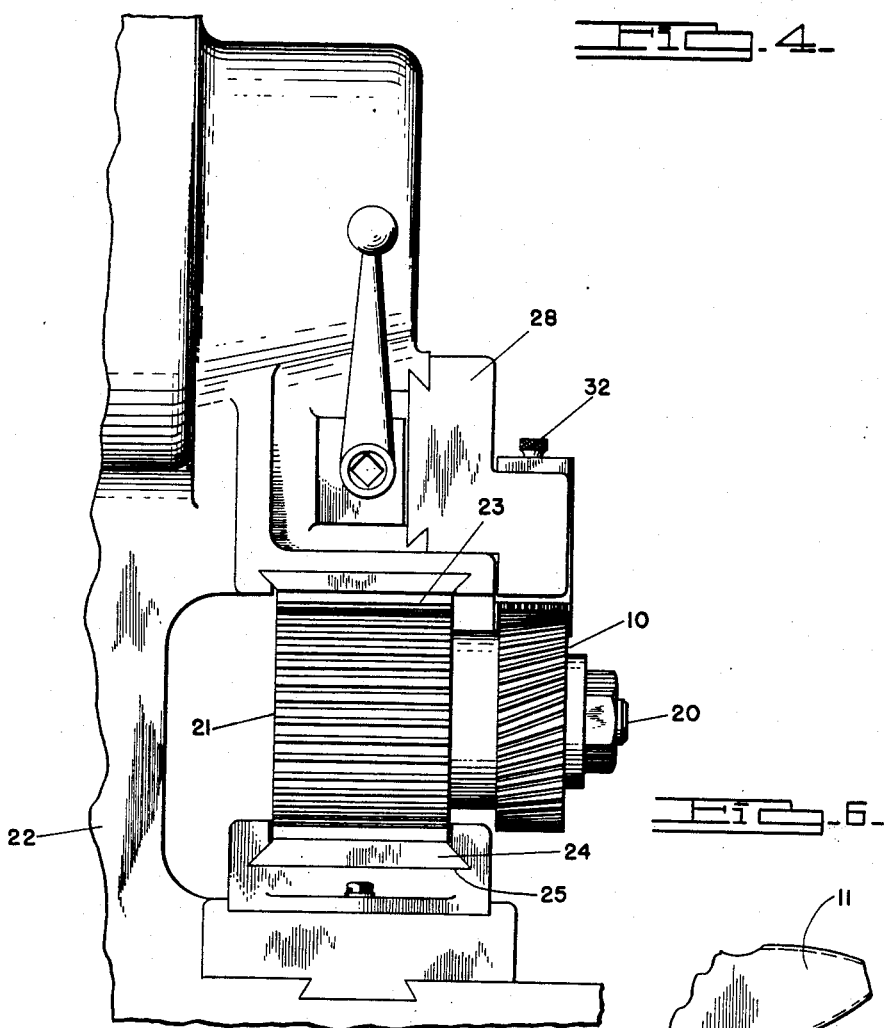
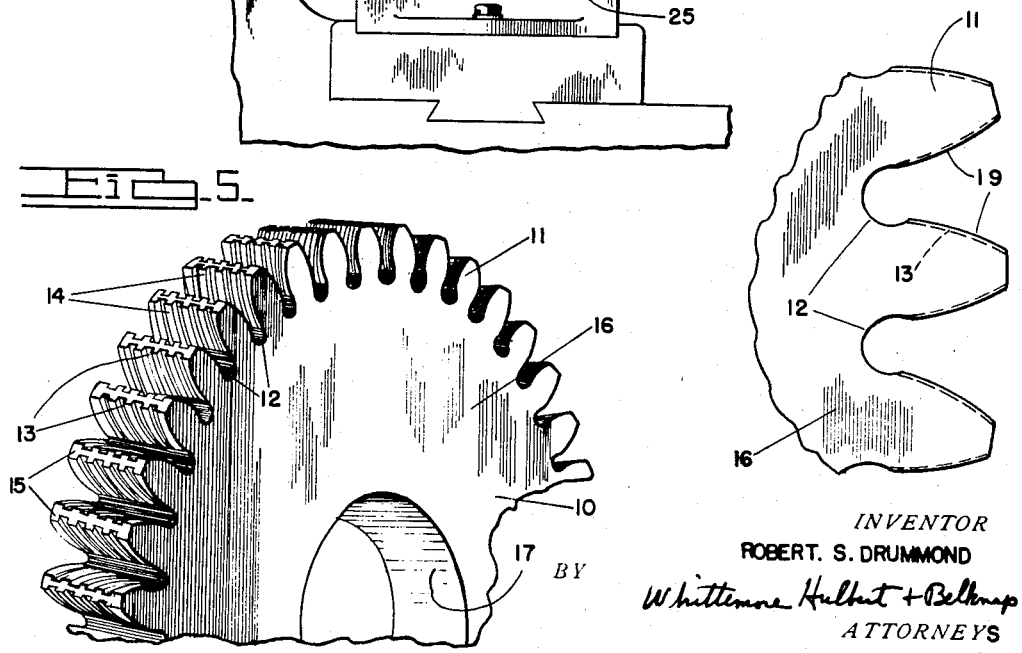
INVENTOR
ROBERT. S. DRUMMOND
BY Whittemore Hulbert + Belknap.
ATTORNEYS

UNITED STATES PATENT OFFICE 2,169,632

METHOD OF MAKING ROTARY GEAR CUTTERS

Robert S. Drummond, Detroit, Mich.

Application February 8, 1937, Serial No. 124,791

3 Claims. (Cl. 76—101)

The invention relates to a method for manufacturing cutting tools, and more particularly to a method for making a rotary gear cutting tool adapted for cutting or shaving gears to obtain extreme accuracy, such as that shown in my Patent 2,126,178, granted August 9, 1938, Rotary gear cutting tool.

My invention is particularly directed to the manufacture of rotary gear cutting tools from a single metal blank of high speed steel. A gear cutter of this type must be made with extreme accuracy since the accuracy of the gears which are to be finished by the cutting tool are dependent upon the accuracy of the cutting tool itself. It is therefore necessary that the tooth profiles of the gear cutting tool be maintained within an accuracy of a few ten thousandths of an inch and that the profiles be capable of being obtained in accordance with a predetermined curve which, in many instances, is not a true involute curve but some modified type adapted for a particular purpose. In the preferred form of gear cutting tool the edges of the gear teeth are gashed or serrated and the width of the serrations must be small, and I have therefore found it necessary to devise new methods for obtaining the desired cutting tool which lend themselves to extreme accuracy but at the same time are capable of being preformed on a commercial production basis.

The principal object of this invention is to obtain improved methods for making a rotary gear cutter of the type above described, although the invention is also useful for the manufacture of other forms of cutting tools.

In the drawings:

Fig. 4 is a side view of the machine shown in Fig. 1;

Fig. 5 is a fragmentary perspective view of a rotary gear cutter made in accordance with my invention;

Fig. 6 is a fragmentary face view of the rotary gear cutter.

Figure 1:
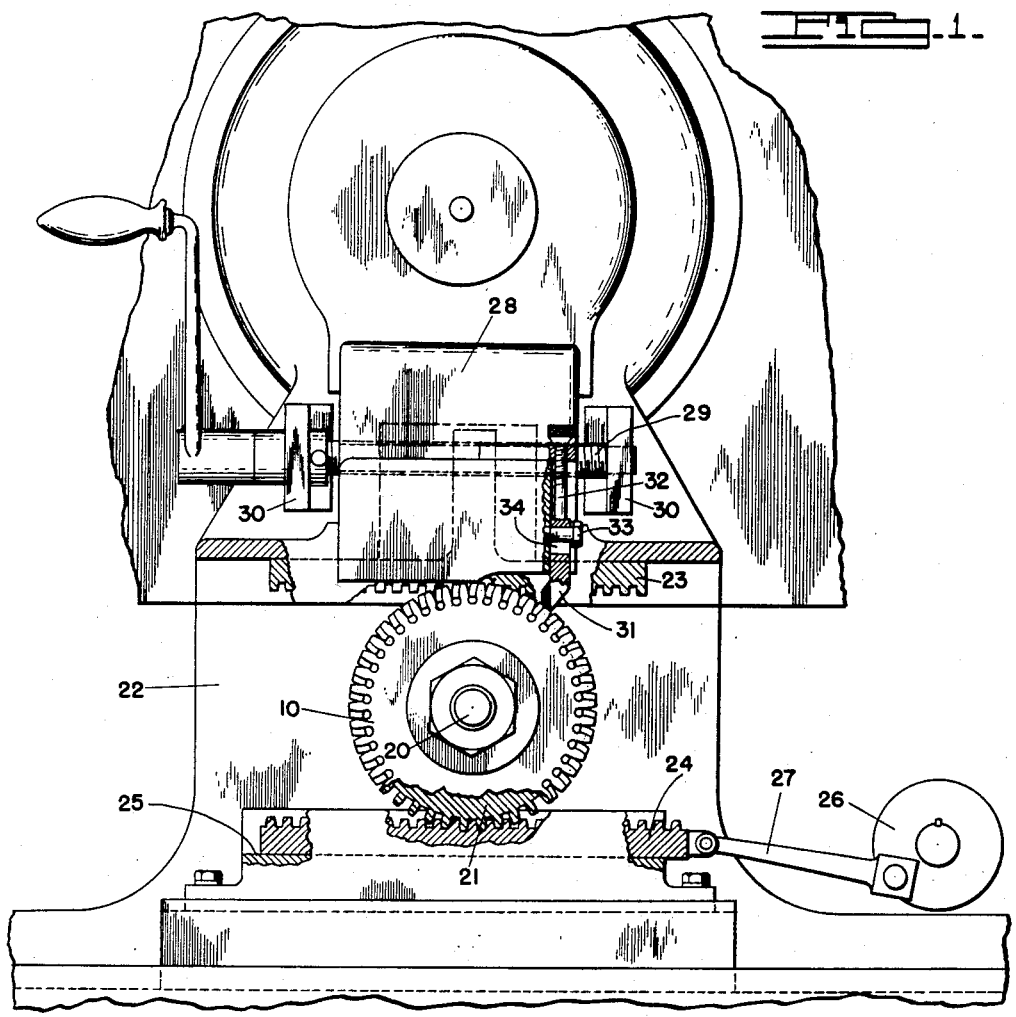
Fig. 1 is an elevation partly in section of a machine for serrating the sides of the cutter teeth.

A rotary gear cutting tool is shown in Figures 5 and 6. This cutting tool is designated by the reference character 10 and is preferably formed from a forged high speed steel blank. The gear teeth 11 are preferably helical but, in some instances, they may be of the spur type. A series of transversely extending cylindrical holes 12 are arranged at the roots of the teeth forming a cylindrical relief slot. The sides of the teeth are provided with a series of serrations 13 extending from the tops of the teeth to the cylindrical holes or clearance slots 12. The serrations are closely spaced to form intermediate lands 14 of approximately the same width as the width of the serrations. In one desirable form of tool the width of the slots and lands are each .035 inch and the depth of the serrations is also .035 inch. Preferably the lands 15 adjacent the end faces are greater in width than the intermediate lands 14, although in some instances they are of equal width. In the finished cutting tool the side faces 16 are ground to accurate parallelism while the side faces 19 of the teeth are accurately ground to the exact profile desired, which while in general is of involute curvature is nevertheless usually modified from true involute curvature.

In the preferred method of making the above described rotary gear cutting tool, I first obtain a blank of high speed steel forged for condensation of grain and carefully anneal the same. The blank must have no surface defects, seams or other objectionable flaws. The blank is slightly larger than the final dimensions of the gear cutter in order that it may be machined on all surfaces. The helical teeth are preferably formed in the blank by a hobbing process leaving sufficient excess metal for the final profiling of the tooth curves. After the teeth are hobbed the cylindrical relief holes 12 are drilled, and these holes are of sufficient diameter so that the cutting tool used in the serrating operation hereinafter described will run out into the clear when traversing from the top to the root of the tooth. The next operation is to form the serrations in the sides of the teeth and this will be described in detail hereinafter.

After the teeth are serrated the blank is heat treated to give the desired hardness to the metal, usually a Rockwell hardness of 62 to 63. The heat treated blank may if desired be subject to a sand blast and then is finish ground. The side faces 16 are ground to accurate parallelism. The inside diameter 17 of the central aperture is ground and the outside diameter is ground sufficiently to remove the surface metal.

The profile of the teeth is then accurately ground by a suitable mechanism. After the profile of the teeth is obtained, the outside diameter of the teeth is ground to the proper addendum. The rotary gear cutter is then carefully checked for accuracy of all essential dimensions and curvature and is ready for use for cutting or shaving gears in gear cutting machines of the type referred to in my above mentioned patent.

The method of making the tool about to be described is a preferred embodiment of the invention although certain modifications of the principal steps are contemplated. Referring to Figs. 1 to 4, it will be observed that the tool 10 is accurately centered on and secured to shaft 20, the latter also having rigidly connected thereto a gear 21. Adjustably secured to base 22 above shaft 20 is a rack 23 with which gear 21 is adapted to mesh, while below the shaft is a second rack 24 slidably guided in ways 25 on the base. Suitable driving means, indicated by crank 26 and connecting rod 27 in Fig. 1, are adapted to reciprocate rack 24. Since rack 23 is stationary and rack 24 reciprocates it is apparent that gear 21 is given a rolling motion which, of course, is transmitted to tool 10. Mounted on the base above the two racks and slidably adjustable with respect to the base is a carriage 28. Adjustment of the carriage is effected by a lead screw 29 journaled in brackets 30 and having a threaded connection with the carriage. A cutting tool 31 is secured to the carriage and is adjustable vertically thereon, an adjusting screw 32 being provided for this purpose. The cutting tool is fixed in its adjusted position by means of a screw 33 disposed within an elongated slot 34 in the tool.

Figures 2, 3:
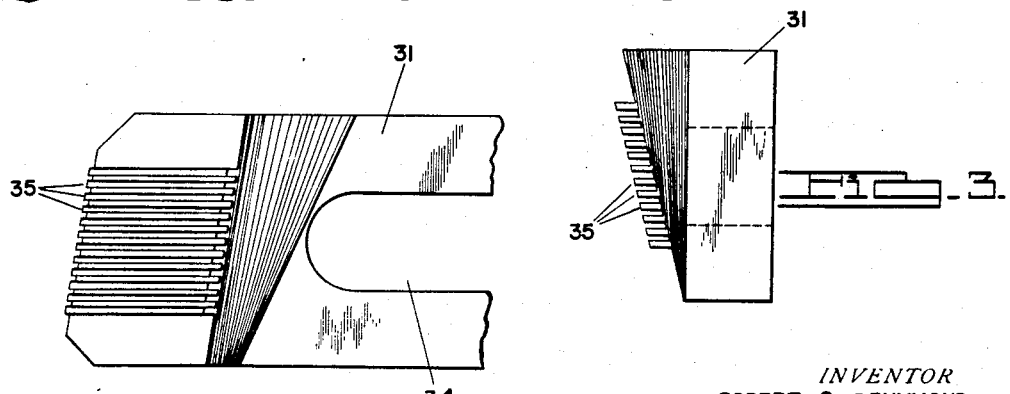
Fig. 2 is a face view of the serrating tool.
Fig. 3 is an end view of the serrating tool.

The particular type of tool employed for cutting the serrations 13 in the teeth of the gear finishing tool comprises a generally rectangular block of tool steel. Adjacent an end of the block the tool is provided with a series of projecting ribs 35 forming cutting members. These ribs are dimensioned to make the proper cut necessary to produce serrations and lands in the teeth as desired. If the gear finishing tool is to be one having straight spur teeth the ribs on the cutting tool will of course be parallel to the axis of the finishing tool, but if the gear tool is provided with spiral teeth the lower end of the block is distorted at an angle corresponding with the angle of the spiral teeth. The latter form of cutting tool is illustrated in Figs. 2 and 3. If now the finishing tool is given a rolling motion by rack 24 the cutting edges will correspond to an element of the stationary rack. Consequently these edges will cut a series of involute gashes in the sides of the tool teeth. The cutter is advanced progressively to make a number of cuts until the serrations have been cut to the desired depth. The finishing tool can then be reversed to perform a like cutting operation on the other sides of the teeth. It is to be noted that the cylindrical relief slots 12 at the base of the teeth permit the gashes or serrations to be made to a uniform depth over the entire tooth. This is highly advantageous insofar as regrinding is concerned, because it is evident that regardless of the number of regrinds, the recesses always open into the relief slots.

After the serrations have been cut in the teeth of the finishing tool the same is finish ground to the proper profile. It is of the utmost importance that this profile be accurate within small limits and that the teeth be ground to the proper curvature.

It has been previously stated herein that the finishing tool is subjected to a heat treatment after the serrations have been cut in the faces of the teeth but prior to the grinding operations. While it is necessary to accurately finish grind the lands between the serrations the serrations themselves are not ground but retain the surface characteristics of the steel after heat treatment. Neither are the cylindrical surfaces of the relief slots finished but have the same surface characteristics. This causes the surface within the serrations to have a higher degree of hardness than the finished surfaces. Thus where a cutter is manufactured of heat treated steel such that the finished surfaces have a hardness between 62 and 64 Rockwell, the hardness of the unfinished surfaces within the serrations will normally have a hardness as high as 70 Rockwell or more.

It has previously been pointed out that the root relief slot between the teeth of the cutter is preferably in the form of a transversely extending cylindrical hole 12. This is of sufficient size to properly act as an avenue for the flow of oil past the cutter to assist in carrying off the chips. In normal operation oil is forced against these holes, thereby driving the chips from the face of the tool, and the combination of oil flow and the high speed rotation of the cutter effectively throws off all chips. The provision of cylindrical relief slots at the bottom of the teeth is also advantageous, for the reason that such slots are necessary in serrating the sides of the teeth. The relief is of sufficient size to permit the serrating tool to run out into a clear space at the bottom of the tooth and prevents damage to the serrating cutter.

It has been previously stated that a preferred relationship between the width of the serrations and lands be maintained, but generally it is desirable to keep the widths of the lands within relatively small dimensions to prevent burnishing action. The width of the gashes is determined by the amount of chip clearance desired and by the amount of metal which it is desired to be forced between the lands to determine the cutting action. Where the cutter is desired for heavy rough cutting action, the gashes are made wider than for lighter finishing action.

In a cutter designed for normal operations, it is usual to employ not less than six serrations, nor more than twenty. Generally, it is desirable to have the lands at the ends of the teeth somewhat wider than the intermediate lands to provide proper support for the cutting edges. The serrations in the cutter teeth are preferably of the same approximate curvature as the profile of the lands. However, it is not essential that the profile of the bottoms of the serrations should be curved, so long as they provide the proper clearance for metal during the cutting operation.

It will be apparent also that a rotary tool of the type shown in Figures 5 and 6 may have the grooves 13 therein cut by the milling cutter 75 in the same manner as outlined above, the only difference being that instead of first providing the slots 72 and 74, the blank is provided with the circular relief slots 12. This is illustrated in Figure 22.

What I claim as my invention is:

1. In the method of making a rotary gear finishing tool having alternate lands and grooves on the faces of the teeth thereof, the steps of providing enlarged slots at the roots of said teeth between said teeth, rolling said rotary tool relative to a fixed serrating tool so as to cause said fixed tool to cut grooves from the top of said teeth to the enlarged slots.

2. In the method of making a rotary gear finishing tool having alternate lands and grooves on the faces of the teeth thereof, the steps of providing enlarged slots at the roots of said teeth between said teeth, rolling said rotary tool back and forth relative to a fixed tool so as to cause said fixed tool to cut grooves from the top of said teeth to the enlarged slots, and limiting the amplitude of said rolling motion so that said fixed tool completes each working stroke with the cutting edges thereof in a free condition in said slots.

3. In the manufacture of gear cutting tools, the steps of forming enlarged slots between adjacent teeth of a gear-like tool blank, supporting a serrating tool in the form of a thin blade having cutting ribs formed thereon adjacent said blank, providing a relative rolling motion between said blank and serrating tool to cause said ribs to traverse the faces of said teeth, and limiting the amplitude of said rolling motion such that the cutting edges of said ribs are arrested in a free condition in said slots.

ROBERT S. DRUMMOND.